No. 727,275.

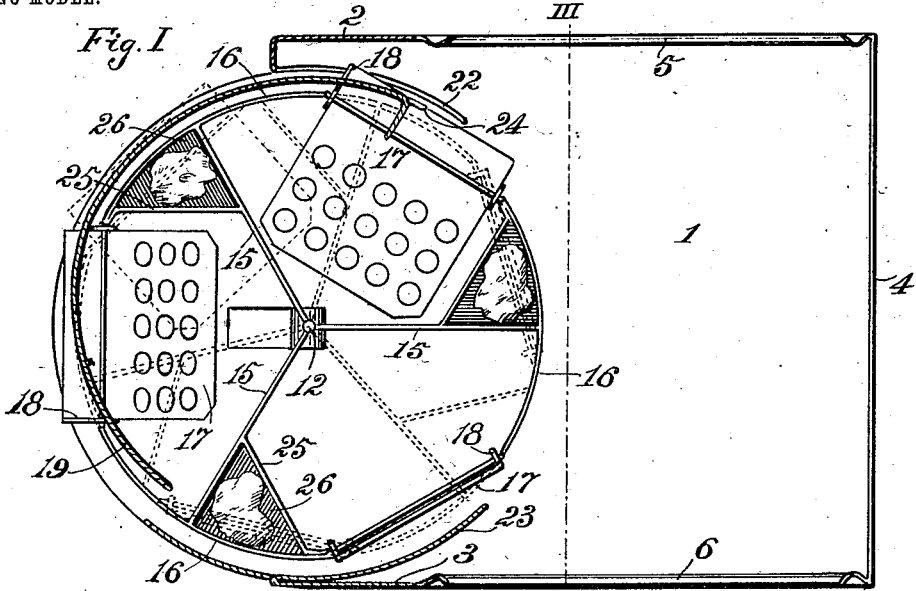

Patented May 5, 1903.

UNITED STATES PATENT OFFICE.

CALVIN C. BOWEN, OF LOS ANGELES, CALIFORNIA, ASSIGNOR TO RINGE MANUFACTURING COMPANY, OF LOS ANGELES, CALIFORNIA, A CORPORATION OF CALIFORNIA.

ANIMAL-TRAP.

SPECIFICATION forming part of Letters Patent No. 727,275, dated May 5, 1903.

Application filed June 26, 1902. Serial No. 113,363. (No model.)

*To all whom it may concern:*

Be it known that I, CALVIN C. BOWEN, a citizen of the United States, residing at Los Angeles, in the county of Los Angeles and State of California, have invented a new and useful Animal-Trap, of which the following is a specification.

My invention relates particularly to a trap into which animals may be lured, caught, and retained therein alive.

One object of my invention is to provide a trap which is self-setting and continuous in action, which may be manufactured economically, is of simple construction, effective in operation, and durable.

Another object is to provide a trap which will catch the animal without mutilating the animal's fur or causing unnecessary torture.

Referring to the drawings, Figure I is a plan view of the trap with the top removed. Fig. II is an end elevation of the trap, showing the parts in another position. Fig. III is a section on line III III of Fig. I. Fig. IV is a perspective of the trap. Fig. V is a detail of portions of the trap.

A rectangular box-like cage is formed of a bottom 1, side walls 2 and 3, and an end wall 4. The side walls and end wall may be perforated, as shown, to admit air to the cage and also to allow inspection of the interior. The upper edges of the side walls may be beaded, as at 5 and 6.

7 is a cover having curled edges 8 and 9, which slidably engage, respectively, the beads 5 and 6. The cover is provided at one end with a wing 10, which may bear against the end wall 4 and form a stop to hold the cover in position. One end of the cage has a fixed top or cover 11, the outer edge of which is curved in the form of a semicircle.

12 is a shaft journaled at 13 and 14 to the top 11 and the bottom 1, respectively.

A series of bottomless stalls are formed by walls 15, which are rigidly attached to the shaft 12 and project radially therefrom. A series of segmental curved walls 16 are carried by the radial walls 15. Each stall is provided with a pendulous door 17, which is hinged to adjacent segmental walls. Each door is provided with a wing 18 on one side thereof and near its upper edge. The doors are preferably perforated, as shown, to admit air and also to minimize their weight.

Extending downwardly from the top or cover 11 is a peripheral flange 19, which has an inclined face 20 and is provided with serrations or notches 21. 22 and 23 are curved walls which extend from opposite sides of the side walls 2 and 3 and lie substantially concentric with the shaft 12. 24 is an abutment or stop formed by the end of the flange 19 and provides a means against which a wing 18 of a door may strike to prevent reverse rotation of the stalls when an animal endeavors to escape and seeks to move the stalls reversely.

A bait-receptacle in the inner corner of each stall is provided by a perforated wall 25 and a bottom 26, which also serve as a brace to hold the walls 15 rigidly with respect to each other.

The trap may be set as shown in Fig. II, in which position of the parts one of the doors 17 is held aslant and open by its wing 18 bearing against the edge of the flange 19. When an animal lured by the bait enters the open stall, he seeks to obtain the bait which lies in the bait-receptacle and by rooting against the perforated wall 25 in his endeavors to obtain the bait gradually moves the bait-receptacle, and thereby causes the stalls to slowly revolve. The animal, still persisting in his efforts to obtain the bait, eventually brings the stall into communication with the interior of the cage. Fig. I shows a stall in such position. Being unable to obtain the bait, the animal seeks to escape and naturally moves forward out of the stall and into the interior of the cage, where he is held a prisoner. When the animal has moved the stall enough to bring the door beyond the end of the flange 19, the door swings down and bears against the animal to push him out of the stall, and is thus a further persuasion for him to leave the stall and enter the cage, whereupon the door swings by gravity into its natural vertical position, as shown in Fig. III.

It is impossible for the animal to escape by retreat either while he is in the stall or after he is in the cage, as reverse movement of the stalls is prevented by the wings on the doors engaging the notches in the edge of the flange. The stop 24 also stands in the way of the door, which has moved beyond it, when the door is either suspended or in vertical position.

In the foregoing operation as the animal roots against the bait-receptacle another stall is brought into outside communication, its door being automatically raised by the wing of the door sliding along the inclined edge of the flange. Should the animal reënter the stall and continue rooting against the bait-receptacle and attempt to move the stall into its original position, it is still impossible for him to escape, as the door will strike against the wall 23, as shown in Fig. V, and thus prevent the stalls from rotating.

I do not desire to limit myself to the particular construction herein described and shown, as it is obvious that many variations may be made therein without departing from the spirit of the invention as defined in the claims.

Having described my invention, what I claim, and desire to secure by Letters Patent of the United States, is—

1. A cage, a stall closing a portion of said cage and movably mounted on said cage, a door for said stall, means for guiding said stall into communication with the interior of the cage, and means lying in the path of movement of said door for holding said door open.

2. A cage, a stall pivotally mounted on said cage and closing one end of said cage, a door for said stall, and means lying in the path of movement of said door for holding said door open.

3. A cage, a stall pivotally mounted on said cage and closing one end of said cage, a door for said stall, said cage having an inclined portion in the path of movement of said door.

4. A cage, a stall pivotally mounted on said door and closing one end of said cage, a door hinged to said stall, said cage having an inclined portion in the path of movement of said door, said inclined portion having an abutment, a portion of said door bearing against said inclined portion.

5. A cage, a stall pivotally mounted on said cage and closing one end of said cage, a pendulous door pivoted to said stall, said cage having an inclined portion in the path of movement of said door, a portion of said door bearing against said inclined portion.

6. A cage, a stall pivotally mounted on said cage and closing one end of said cage, a pendulous door pivoted to said stall, said cage having a serrated inclined portion in the path of movement of said door.

7. A cage, a vertical shaft in said cage, a plurality of stalls carried by said shaft, doors closing said stalls, said cage having a serrated inclined portion, said doors bearing against said inclined portion.

8. A cage, a vertical shaft mounted in said cage, a stall carried by said shaft, a bait-receptacle in said stall, a pendulous door hung to said stall, said cage having a serrated inclined portion, said door bearing against said inclined portion.

9. A cage, a vertical shaft mounted in said cage, a stall rigidly connected to said shaft, a bait-receptacle in said stall, a pendulous door hung to said stall, said cage having a serrated inclined portion, a wing on said door bearing against said inclined portion.

10. A cage, a vertical shaft mounted in said cage, a stall carried by said shaft, a segmental curved wall partially inclosing said stall, a bait-receptacle in said stall, a door hung to said stall, said door having a wing bearing against said inclined portion, and a curved wall extending into said cage and substantially concentric with and closely adjacent to the segmental wall of a stall.

11. A cage, a vertical shaft mounted in said cage, a stall carried by said shaft, a bait-receptacle in said stall, a door hung to said stall, said door being provided with a wing which bears against said inclined portion, said cage having curved vertical walls which lie concentric with the path of travel of said stalls and closely adjacent thereto, each wall extending from opposite sides of the cage.

12. A cage, a stall pivotally mounted on said cage and closing one end of said cage, a pendulous, perforate door hinged to said stall, and a perforate bait-receptacle in said stall.

13. A cage, and a series of stalls revolubly mounted in one end thereof, said stalls being movable consecutively into and out of communication with the interior of said cage.

14. A cage, and a series of stalls revolubly mounted in one end thereof, means for holding bait in said stalls, doors for said stalls, and means for opening said doors.

15. A cage, a bottomless stall revolubly mounted in one end of said cage, a door hung in the opening of said stall, and means for opening said door.

16. A cage, a bottomless stall revolubly mounted in one end of said cage, a door hung in the opening of said stall, and automatic means for opening said door.

In witness whereof I have signed my name to this specification, in the presence of two subscribing witnesses, at Los Angeles, in the county of Los Angeles and State of California, this 20th day of June, 1902.

CALVIN C. BOWEN.

Witnesses:
E. A. MILLER,
JOHN A. MORRIS.

It is hereby certified that the name of the assignee in Letters Patent No. 727,275, granted May 5, 1903, upon the application of Calvin C. Bowen, Los Angeles, California, for an improvement in "Animal-Traps," was erroneously written and printed "Ringe Manufacturing Company," whereas said name should have been written and printed *Rindge Manufacturing Company;* and that the said Letters Patent should be read with this correction therein that the same may conform to the record of the case in the Patent Office.

Signed and sealed this 9th day of June, A. D., 1903.

[SEAL.]

F. I. ALLEN,
*Commissioner of Patents.*